H. VERHAGE.
Process for Curing and Canning Sausage Meats.
No. 224,563.  Patented Feb. 17, 1880.
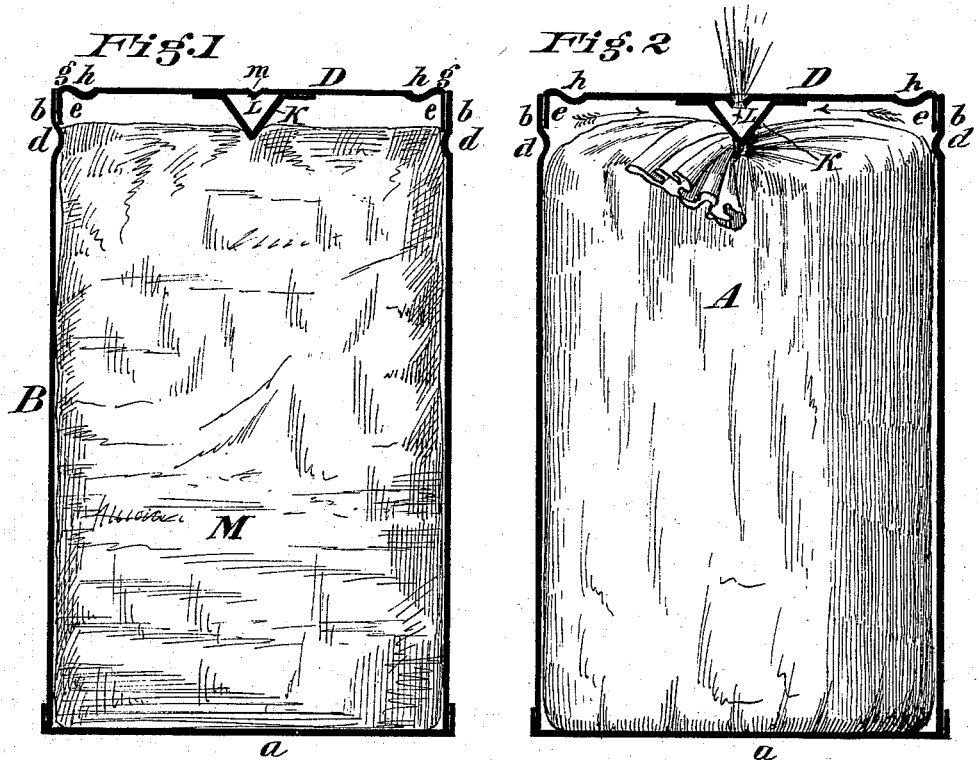

UNITED STATES PATENT OFFICE.

HENRY VERHAGE, OF CINCINNATI, OHIO.

PROCESS FOR CURING AND CANNING SAUSAGE-MEAT.

SPECIFICATION forming part of Letters Patent No. 224,563, dated February 17, 1880.

Application filed July 28, 1879.

*To all whom it may concern:*

Be it known that I, HENRY VERHAGE, a resident of the city of Cincinnati, in the county of Hamilton and State of Ohio, have invented certain new and useful Improvements in the Process of Curing, Packing, and Canning Sausage-Meat, of which the following is a specification.

The object of my invention is to secure certain advantageous results connected with curing, packing, and canning of sausage-meat, to wit, preventing shrinkage of meat when packed in the can, greater excellence in the flavor and quality of the meat when packed, greater expedition in the packing of the meat into the cans or metal cases, and an improvement in the process of curing it whereby the meat is better prevented from decay.

The main features of my invention are, first, the insertion of the sausage-meat into a bag of the size and shape of the interior of the can into which the meat is finally to be placed, and the submission of the meat while in the said bag to a process of smoking; second, in a novel process of cooking the meat in the can, said process being hereinafter more fully described.

In the accompanying drawings, making part of this specification, Figures 1 and 2 are vertical central sections of a can and its lid, the package of meat within not being shown in section, but as it appears when the side of the can is stripped off.

In Fig. 2 the package of meat in the can is shown in the bag heretofore referred to, and in Fig. 1 is shown without the bag, the latter having been taken off from it.

The meat to be made into sausage is first finely cut up in the usual manner and by any suitable device. It is then placed within a bag, A, (see Fig. 2,) which is somewhat larger than the can B. The bag is now compactly filled with meat M and the mouth thereof closed with a string tied thereabout, and the bag and its contents are thoroughly smoked after the manner of smoking hams, quarters of beef, &c. This smoking of the meat causes it to shrink, and also solidifies together the entire mass of meat, and further cures it and aids in preventing its decay after it is placed within the can. Furthermore, the shrinkage in the meat, which usually takes place by the drying up of the latter after being placed within the can, is obviated by my process, inasmuch as the shrinkage is caused to take place before the meat is placed in the can. I am therefore enabled to give the consumer a better filled package, and also one of which the meat is more thoroughly cured. A small quantity of cloves, and likewise of gelatine or tallow, is placed in the bottom of the can. The bag is now placed within the can B and the top of the bag crowded down even with the top of the can, after which the top is fitted and soldered to the can, and the latter is placed in a vessel of boiling water and boiled for the space of two hours, after which it is immediately vented—that is, the lid is punctured at the center $m$ by a pick or sharp-pointed punch. The gelatine or tallow, which has been caused to boil within the can during the boiling operation just alluded to, has created a sufficient vapor. &c., to cause the gelatine to expel all of the liquid contained in the meat in the can through an orifice punched at $m$. As soon as the liquid and vapor have been quite fully expelled the vent-hole $m$ is immediately closed by solder, and on the cooling of the can a vacuum is created in the latter, which aids in keeping the meat pure and sweet. Finally, the can is placed in a closed vessel and subjected to a second cooking of about a half an hour in length by steam of a temperature of 250° to 260° Fahrenheit, and subjected to a pressure of some thirty pounds to the square inch. The pressure of the steam on the outside of the can aids in counterbalancing the pressure of the steam generated within the can, and thus preventing the can from bursting.

My invention is applicable to any description of meat.

When the cans are short the meat M may be divested of the bags and placed within the can, as shown in Fig. 1.

What I claim as new and of my invention, and desire to secure by Letters Patent, is—

The above-described process of curing and packing meat, consisting of various steps, as follows: cutting up the meat and placing it within a bag and subjecting it to a thorough smoking, after which said bag of smoked meat is placed and securely sealed in a can, which is placed in a vessel and boiled, after which the can is vented to allow the liquid to escape; the vent is then closed and the whole subjected to a second cooking under a high pressure of steam, all substantially as and for the purposes specified.

Attest:     HENRY VERHAGE.
  E. H. FOSTER,
  JNO. W. STREHLI.